United States Patent
Kumabe et al.

(10) Patent No.: US 6,316,035 B1
(45) Date of Patent: Nov. 13, 2001

(54) FERMENTED ORGANIC ACID THAT CHANGES CELL AND PROTEIN FUNCTIONS AND METHOD OF MAKING

(75) Inventors: Kiyoshi Kumabe, Chiba; Hiroyuki Yanaka, Kanagawa; Akiko Ishimoto, Tokyo, all of (JP)

(73) Assignee: KITII Corporation Ltd., Tokyo (JP)

( * ) Notice: Subject to any disclaimer, the term of this patent is extended or adjusted under 35 U.S.C. 154(b) by 0 days.

(21) Appl. No.: 09/581,293

(22) PCT Filed: Nov. 12, 1998

(86) PCT No.: PCT/JP98/05097

§ 371 Date: Jun. 12, 2000

§ 102(e) Date: Jun. 12, 2000

(87) PCT Pub. No.: WO00/21384

PCT Pub. Date: Apr. 20, 2000

(30) Foreign Application Priority Data

Oct. 12, 1998 (JP) .................................................. 10-289234

(51) Int. Cl.$^7$ ....................................................... A23B 4/12
(52) U.S. Cl. .............................. 426/321; 426/44; 426/46; 426/49; 426/51; 426/55
(58) Field of Search .................................. 426/44, 46, 49, 426/51, 55, 321

(56) References Cited

U.S. PATENT DOCUMENTS

| 3,912,821 | * | 10/1975 | Chandler ................................ 426/46 |
| 3,932,671 | * | 1/1976 | Yokotsuka et al. .................... 426/46 |
| 4,141,996 | | 2/1979 | Chandler et al. . |

FOREIGN PATENT DOCUMENTS

| 55-42543 | 3/1980 | (JP) . |
| 1-206964 | 8/1989 | (JP) . |
| 3-277247 | 12/1991 | (JP) . |
| 9-98735 | 4/1997 | (JP) . |
| 10-108651 | 4/1998 | (JP) . |
| 10-84901 | 4/1998 | (JP) . |

* cited by examiner

*Primary Examiner*—Helen Pratt
(74) *Attorney, Agent, or Firm*—Finnegan, Henderson, Farabow, Garrett & Dunner, LLP

(57) ABSTRACT

The object of the present invention is to develop an agent to keep proper moisture, improve the mouth-feeling and preserve freshness of cells and protein-containing-materials which does not cause any side-effect. This object can be accomplished by contacting cells or protein-containing materials with an organic acid fermentation liquid which has been adjusted to pH6–10 by adding a carbonate.

10 Claims, No Drawings

FERMENTED ORGANIC ACID THAT CHANGES CELL AND PROTEIN FUNCTIONS AND METHOD OF MAKING

FIELD OF THE INVENTION

The present invention relates to an organic acid fermentation liquid for altering the function of a cell or protein.

BACKGROUND OF THE INVENTION

Until now, there have been various methods for tenderizing meat, such as using a protease (JP-A-7-313108), polyphosphate (JP-A-58-23767), sodium chloride or surfactant.

None of these methods, however, could provide satisfying meat tenderization: protease causes overdecomposition, resulting in too soft meat; polyphosphate not only absorbs water to make meat watery but also may cause possible side-effects since it is a synthetic compound; sodium chloride is not suitable for foods since its larger amount is required to make meat softer which makes meat too salty; and a surfactant cannot tenderize meat sufficiently since it does not permeate into the depth of meat.

On the other hands, phosphates, antibiotics and antioxidants have traditionally been used to preserve freshness of fishery products and vegetables.

However, these traditional freshness-preserving methods also had problems. For example, phosphate may make foods watery and allow drippings containing flavorous components to flow out; an antibiotic cannot keep resilience of foods and has inferior antioxidation ability; and an antioxidant cannot keep resilience of foods and may have poor antibiotic ability.

The object of the present invention is to develop an agent which can keep proper moisture, provide better mouth-feeling and preserve freshness of cells or protein-containing materials, without causing any side effect.

DESCRIPTION OF THE INVENTION

The present inventors found, after intensive studies, that it is useful to utilize lontophoresis theory to accomplish the above-described object.

"Iontophoresis" is a method for treating diseases in the medical field, comprising delivery of a therapeutic agent to any affected part of interest through ionic repulsion caused by forcibly introducing the same exogenous ions as in the target tissue and applying a voltage to the tissue. This is an efficient method for reversibly modifying terminal filaments of various protein molecules including intracellurar proteins via ionic repulsion in the presence of water.

This structural change causes incorporation of binding water and other co-existing substances into the protein molecules. The present invention utilizes this theory.

Accordingly, the present invention relates to:
(1) an organic acid fermentation liquid produced by fermentation of a carbohydrate(s), wherein the liquid is adjusted to a pH of 6–10 by adding a carbonate salt during the fermentation;
(2) the organic acid fermentation liquid of (1) wherein sodium chloride is added to the liquid;
(3) the organic acid fermentation liquid of (1) or (2) wherein the fermentation is acetate or citric acid fermentation;
(4) a modifier of protein-containing materials which comprises the organic acid fermentation liquid of (1);
(5) the modifier of (3) wherein the protein-containing material is selected from the group consisting of animal meats, fishery products and beans;
(6) a method for modifying a protein-containing material wherein the protein-containing material is contacted with the organic acid fermentation liquid of (1);
(7) the method of (5) wherein the protein-containing material is selected from the group consisting of animal meats, fishery products and beans;
(8) a modifier of plant cells which comprises the organic acid fermentation liquid of (1);
(9) the modifier of (8) wherein the plant cells are derived from vegetables;
(10) a method for modifying plant cells wherein the plant cells are contacted with the organic acid fermentation liquid of (1); and
(11) the method of (10) wherein the plant cells are derived from vegetables.

Regarding the term "ionic repulsion" it is known, for example, that a divalent positive ion will decrease the moisture-holding ability of meat. It is assumed that this is because a divalent positive ion will reduce the electrical repulsive force between negative charge groups so that strong bonds are formed between peptide chains, whereby muscle is tensed and contracted. Thus, it is important to enhance electrical repulsive force to improve the moisture-holding ability of meat.

Factors involved in the moisture-holding ability include pH, positive ions, neutral salts, polyphosphate, citrate, muscular post-death change, electrical stimulation, freezing and thawing, heating temperature and others.

As described above, pH may have a great effect on incorporation of binding water in a protein molecule due to structural change caused by ionic repulsion, particularly in living cells and meat.

According to the present invention, pH is adjusted to generate ionic repulsion.

Meat myosin protein has an isoelectric point of about pH5.0, and it is known to become more exudative at an alkaline pH higher than pH5.0. The maximum efficiency can be seen at pH8–9, though the pH will rapidly drop due to the release of endogenous organic acids in meat or cells.

Polyphosphates or the like have conventionally been used as pH adjusting agents, but they could not inhibit such rapid pH drop caused by the release of endogenous organic acids.

According to the present invention, fermentation liquid may contain an organic acid salt or salts so as to maintain the efficiency by enhancing a high buffering effect to prevent such pH drop.

Under conditions of an alkaline pH and the presence of water, applying negative ions to meat or living cells will result in transfer of various extra- or intra-cellular components. For edible meat, this treatment will improve the taste of meat by allowing their flavorous components (e.g. amino acids, bases, nucleic acids and the like) which are present in the cells to ooze out. Preferable pH range is pH8–9 though pH6–10 can provide the efficient ooze.

The product of the present invention can be produced by the process comprising the following steps:
1. Medium conditioning (carbohydrate, protein, amino acid and mineral)
2. Fermentation (inoculation) inoculate
3. Neutralization (addition) sodium carbonate, sodium bicarbonate or calcium
4. Ripening culture
5. Filtration
6. Sterilization
7. Filling
8. Final product.

Preferable carbohydrates are saccharides and starch.

Any carbonate having a carbonate ion may be used though sodium carbonate, sodium bicarbonate and calcium carbonate are preferable.

Examples of applicable organic acid fermentation are shown in Table 1:

TABLE 1

| Strains | Carbohydrate as energy source | Main components in fermentation liquid |
|---|---|---|
| Aspergillus niger | Glucose | Citrate, Carbonate ions, $Cl^-$ |
| Acetobacter aceti | Ethanol | Acetate, Carbonate ions, $Cl^-$ |
| Aspergillus flavus | Glucose | Malate, Carbonate ions, $Cl^-$ |
| Lactobacillus delbruckii | Glucose | Lactate, Carbonate ions, $Cl^-$ |

Aspergillus niger, Acetobacter aceti, Aspergillus flavus and Lactobacillus delbruckii have been deposited as IAM3001 and ATCC6275, IAM1802, IAM3003 and ATCC9643, and IAM124741 and ATCC9649, respectively.

Particularly, acetate fermentation and citrate fermentation are more practical.

The fermentation according to the present invention may be performed according to any conventional method though carbonate salt may preferably be added in a stepwise manner during the fermentation process.

Fermentation liquid may contain 5% or more and preferably about 10% organic acid, and the liquid may desirably be kept at pH8.0 after neutralization.

An organic acid fermentation liquid which also contains 6–10% sodium chloride will provide improved moisture-holding ability.

Adding the obtained fermentation liquid to proteins in the living cells or proteins in the presence of water will cause ionic repulsion in terminal filaments of proteins to form gaps therebetween, thereby permitting transfer of intra-and extra-cellular water and components contained therein. By using this mechanism, it has been made possible to utilize such fermentation liquid, in various industrial fields, for reversibly converting the functions of cells and/or proteins. Moreover, there is no possibility of side effect such as caused by polyphosphate since such an organic acid fermentation liquid is a naturally occurring product.

Thus, it is now possible to improve quality of the following foods, for example.

| | |
|---|---|
| Animal meats: | Tenderizing, Good taste enhancement, Increase in weight, texture improvement. |
| Fishery products: | Improved resiliency of meet |
| Beans: | Tenderizing, Good taste enhancement |
| Vegetables: | Moisture-holding (freshness keeping), Crispy |

Such fermentation liquids are preferable for Asazuke (vegetables preserved with salt and malt) since they are highly permeable into vegetables and thus reduce time for pickling. The fermentation liquids also enhance the moisture-holding ability of flowers and trees and thus significantly extend their life time. Further, the fermentation liquids can extremely shorten time to permeate seasonings into foods due to good permeability.

According to the present invention, a "protein-containing material" includes, but is not limited to, meats, fishery products and beans. The term "cell" or "cells" include, but are not limited to, those derived from vegetables, flowers and trees.

THE BEST MODE FOR CARRYING OUT THE PRESENT INVENTION

The manufacture product of the present invention may be used by diluting 3–5 times with, normally, water and then, for example, adding the dilution to meat followed by massaging, injecting the dilution into meat, or steeping meat in the dilution.

For beef or pork, injection is preferable especially when it is required to keep its shape or appearance unchanged or to process a block of meat. Preferably, massaging may be continued for about 20 minutes after injection.

For chicken or prawn, massaging is preferable. Particularly effective is massaging in a ribbon mixer or tumbler. More preferably, 5–10 minutes interval may be taken.

For fish, a stationary steep is preferable since fish may be deformed by massaging.

Desirably, the steep is performed at a low temperature (3–6° C.).

EXAMPLE 1

Preparation of Organic Acid Fermentation Liquid

The mixture of 5-times condensed apple juice (1,000 ml) and water (2,000 ml) was added with yeast, followed by fermentation at 25–30° C. Fermentation was stopped when the alcohol content reached is below 1.0% to give fermentation product A.

The fermentation product A was transferred to a fermenter to which acetobacter was then added, followed by acetic acid fermentation at 25–30° C. During the fermentation, sodium carbonate was added to the fermenter step by step until the mixture reached pH8.5 when the fermentation was stopped to give fermentation product B.

The product B was mixed with edible salt (sodium chloride; 10% by weight), and the mixture was sterilized and filtrated to give a product of the present invention.

EXAMPLE 2

Evaluation of Chicken (Chest) Contacted with the Product of the Present Invention (Groups Added with the Product of the Present Invention)

Chicken (domestic broiler, chest) was put in a non-permeable plastic bag. Next, the product of the present invention diluted 5 times with water was added to the chicken in a half amount of the weight of chicken. Then, the plastic bag including air was sealed and placed in a plastic container (16×12×10 cm). Then, the contents in each bag were shaken in a shaker (type MW-1, available from IKE-TOMO RIKA KOGYO, Co. Ltd. under the conditions below.

(Groups with No Additive)

The same procedure was repeated except for using water instead of the product of the present invention.

(Shaking Time)

20 minutes shaking →10 minutes interval →10 minutes shaking (Shaking Speed Dial)

MAX (Test Method)

Free amino acids: Raw meat after shaking step was examined by using an amino acid analyzer (L-8500, available from HITACHI).

Texture: Chicken after shaking step was put (as it was) into a non-permeable plastic from which air was then evacuated, and heated in a hot water bath at 75° C. for 50 minutes. Subsequently, the chicken in the bag was cooled in water stream for 30 minutes and then in a refrigerator (5° C.) overnight. The cooled chicken was examined by using TENSIPRESSER (TTP-50BX, available from Taketomo).

(Sensory Evaluation)

After shaking step, the chicken was covered with flour and then fried in salad oil at 160° C. Next, the fried chicken was left to cool for 30 minutes. Then, 10 examiners evaluated the appearance, color and firmness (teeth sense) of the cut surface, and taste of each chicken.
(Result)
Free amino acids (mg/100 g)

TABLE 2

|  | Not-Added | Added |  | Not-Added | Added |
|---|---|---|---|---|---|
| Aspartic acid | 7.5 | 9.3 | Isoleucine | 15.4 | 18.4 |
| Threonine | 9.1 | 10.8 | Leucine | 8.1 | 9.7 |
| Serine | 13.4 | 16.6 | Tyrosine | 10.3 | 11.6 |
| Glutamic acid | 21.8 | 28.5 | Phenyl alanine | 8.7 | 9.8 |
| Glycine | 8.0 | 10.0 | Prorine | 13.2 | 14.8 |
| Alanine | 16.3 | 20.3 | Lysine | 15.5 | 18.2 |
| Valine | 9.8 | 13.7 | Histidine | 6.0 | 7.1 |
| Methionine | 9.7 | 10.7 | Arginine | 11.9 | 13.9 |

The results in Table 2 show that chicken added with the product of the present invention had about 20% increase in free amino acid content when compared to that of control chicken (i.e., not-added).

Texture

TABLE 3

|  | Firmness (kg/cm$^2$) | Aggregation degree | Resiliency (%) | Adhesion (cm$^2$/cm$^2$) |
|---|---|---|---|---|
| Not-added | 6.83 | 0.48 | 84.5 | 0.05 |
| Added | 4.35 | 0.50 | 82.1 | 0 |

As shown in table 3, chicken treated with the product of the present invention had relatively inferior resilience but superior firmness, aggregation (cohesiveness of meat tissue) and adhesion when compared to those of control chicken (not-added).

Sensory Test

TABLE 4

| Appearance of cooked chicken | All the examiners decided that the cooked chicken treated with the product of the present invention had better color and was more voluminous when compared to those of the control chicken (not-added) |
|---|---|
| Color tone of chicken | All decided that there was no difference between the two. |
| Firmness of chicken | Eight out of ten decided that the cooked chicken treated with the product of the present invention was softer than the control chicken while two decided the difference of softness was little although the treated chicken was soften. |

TABLE 4-continued

| Taste of chicken | All decided that the cooked chicken treated with the product of the present invention was more delicious than the control chicken |
|---|---|

As shown in Table 4, it was proved from the sensory test that the chicken which had been added with the product of the present invention had better appearance, firmness and taste when compared to those of the control chicken (not-added) and that there was no difference between their color tones.

EXAMPLE 3

Frozen domestic broiler chicken (chest) was allowed to thaw at room temperature and treated with the product of the present invention (chicken: the product=100:50 by weight) by massaging at 19° C. for 30 minutes.

Next, the chicken was drained and then cooked on a fry pan on a medium heat for 5 minutes.

| Control (without treatment) | |
|---|---|
| Treatment I (edible salt) | 2.0% |
| Treatment II (sodium bicarbonate) | 1.0% |
| Treatment III (trisodium citrate) | 3.0% |
| Treatment IV (sodium polyphosphate) | 2.0% |
| Treatment V (the present invention) | 20.0% (4% as solid) |

The results were as follows (10 panelists).

TABLE 5

|  | Without treatment | Treatment I | Treatment II | Treatment III | Treatment IV | Treatment V |
|---|---|---|---|---|---|---|
| Initial wt | 100 | 100 g | 100 g | 100 g | 100 g | 100 g |
| Increase in wt (%) |  | 116.1% | 113.8% | 115.7% | 114.3% | 124.3% |
| Yield | 75.3% | 70.6% | 74.2% | 74.2% | 69.6% | 85.6% |
| Taste/Mouth-feeling | Dry and tasteless/Strong smell of raw meat | Very dry and tasteless/Less resilient | Fibrous and very fine fibers remained in mouth/Smell of chemicals | Dry and crumbling/Smell of chemicals | Viscous/Slightly crumbling | Soft and cohesive/Resilient |
| Firmness | 0 | −1.0 | +0.0 | +0.5 | −1.5 | +2.0 |

Increase in weight (%)= weight after treatment÷initial weight×100
Yield (%)= weight after cook÷ initial weight×100
Firmness of chicken: very soft=+3; soft=+2; relatively soft=+1; normal=0; relatively hard=−1; hard=−2; very hard=−3

As apparent from Table 5, the present invention can provide about 10% increase in weight, 10% or more increase in yield, and improved taste and mouth-feeling of meat, as well as tenderize meat.

EXAMPLE 4

Application of the Product of the Present Invention to Beef Stew

Ingredients: Beef thigh, potato, carrot and onion

Potato (30 g), carrot (20 g) and onion (30 g) were cut into bite-size pieces, put into a beaker together with each test liquid (200 g) and then heated to boiling. When boiled, the vegetables were added with beef (50 g) and heated in a hot water bath at about 95° C. for 20 minutes.

Appropriate amount of commercially available roux was added to the beaker which was then heated for additional 10 minutes. Then each of the ingredients in the stew was evaluated for the taste, mouth-feeling and firmness. The results are shown in Table 6 below (10 panelists).

Evaluation was performed for beef treated with the following solutions:

| Control (without treatment) | 3% solution in water |
| Treatment I | 2% solution in water |
| Treatment II | 3% solution in water |

TABLE 6

|  | Without treatment | Treated Treatment I | Treated Treatment II |
| --- | --- | --- | --- |
| Taste/mouth-feeling | Strong smell of raw meat, dry and tasteless./ Vegetables were half-cooked. | No smell of raw meat, soft./ Vegetables were well cooked and sweet. | No smell of raw meat, juicy./ Vegetables were over-cooked and melting. |
| Firmness (beef) | −2 | +1 | +2 |
| Firmness (vegetable) | −1 | +2 | +3 |

Firmness scores: very soft = +3; soft = +2; relatively soft = +1; normal = 0; relatively hard = −1; hard = −2; very hard = −3

As shown in Table 6, Treatment I where the ingredients were treated with the product of the present invention (2% solution in water) was the most preferable.

EXAMPLE 5
Application of the Present Invention to Prawn

Ingredients: Frozen prawns (black tiger)

Frozen prawns were thawed in water stream and peeled, and their internal organs were removed.

The prawns were steeped in each treatment liquid (prawn to liquid ratio of 100:100 by weight) in a refrigerator at 6° C. for 18 hours. Next, the prawns were steamed for 3 minutes. Results are shown in Table 7 below.

TABLE 7

|  | Without treatment | Treated |
| --- | --- | --- |
| Increase in wt (%) after treatment | 100.0 | 115.6 |
| Yield after cooking (%) | 64.9 | 82.9 |
| Taste and Mouth-feeling (10 Panelists) | Relatively bitter and smelling. Dry and tasteless, less resilient. | Relatively sweet. Juicy, soft and resilient. |

As apparent from Table 7, prawns treated with the product of the present invention showed significantly improved mouth-feeling, yield and taste.

EXAMPLE 6
Application of the Product of the Present Invention to Soybean

Ingredient: Soybeans produced in Hokkaido

Dried soybeans were steeped in water (control) and the product of the present invention (treated) in beakers, respectively, at a ratio of 1:3 (soybean: liquid) for 2 hours. Next, the beakers containing soybeans were put in water bath at about 95° C. and the bath was heated to the boil. When the bath boiled, 4 volumes of water or the product of the present invention was further added relative to one volume of the soybeans in the respective beakers and the soybeans were boiled for 1 hour or 1.5 hours.

| Control 1 (without treatment) |  | 1 hour |
| Treatment I (the present invention) | 5% solution in water | 1 hour |
| Treatment II (the present invention) | 10% solution in water | 1 hour |
| Treatment III (the present invention) | 15% solution in water | 1 hour |
| Control 2 (without treatment) |  | 1.5 hour |
| Treatment IV (the present invention) | 5% solution in water | 1.5 hour |
| Treatment V (the present invention) | 10% solution in water | 1.5 hour |
| Treatment VI (the present invention) | 15% solution in water | 1.5 hour |

Each of the soybeans treated with any of the liquids above was evaluated for the taste, mouth-feeling and firmness by 10 panelists.

TABLE 8

|  | Firmness | Mouth-feeling | Taste |
| --- | --- | --- | --- |
| Control I | −1 | Very crumbling and half-cooked | Taste of uncooked soybean |
| Treatment I | +1 | Relatively crumbling | Flavor of soybean |
| Treatment II | +1.5 | Relatively viscous, too-boiled | Flavor of soybean |
| Treatment III | +1.5 | Very viscous, too-boiled | Very sweet |
| Control II | +1 | Half-cooked | Less sweet and flavorous |
| Treatment IV | +1.5 | Appropriately cooked | Flavor of soybean, sweet |
| Treatment V | +2 | Very soft | Very sweet |
| Treatment VI | +2.5 | Too soft | Too sweet, unpleasant |

Firmness scores: very soft = +3; soft = +2; relatively soft = +1; normal = 0; relatively hard = −1; hard = −2; very hard = −3

It is apparent from Table 8 that treatments II, III and IV are preferable. In short, it was proved that the product of the present invention is added preferably in a range of 10–15% by weight when boiling time is 1 hour while about 5% when 1.5 hours.

As seen from the results that soybeans of both controls I and II were not cooked well, boiling time can be reduced by almost 50% by adding the product of the present invention.

EXAMPLE 7
Application of the Product of the Present Invention to Asazuke

Ingredients: cabbage, carrot and cucumber

Cabbage was roughly cut into bite-size pieces. Carrot was cut into thin and rectangular slices. Cucumber was cut into thin slices. These vegetables were packed in a non-permeable plastic bag together with an equal amount (by weight) of each pickling liquid. The vegetables in each bag were stocked in a refrigerator at 40° C. for pickling. After 18 hours, the vegetables were drained and tested for their taste and mouth-feeling. The results are shown in Table 9. (10 Panelists).

Compositions of pickling liquids are listed below.

| Control: Edible salt | 5% solution in water |
|---|---|
| Treatment I: The present invention | 20% solution in water |
| Treatment II: The present invention | 30% solution in water |

TABLE 9

|  | Without treatment | Treated | |
|---|---|---|---|
|  |  | Treatment I | Treatment II |
| Taste and mouth-feeling | Less crispy and strong smell of grass. Not pickled well. | Crispy. Sweet. Pickled. | Crispy. Very sweet. Well pickled |

It is apparent from Table 9 that Asazuke prepared by pickling vegetables using the product of the present invention are more crispy and sweater.

Industrial Applicability

The present invention is useful for improving quality of various foods such as softness and taste.

What is claimed is:

1. A method of producing an organic fermentation liquid comprising fermenting a carbohydrate or carbohydrates and adjusting the liquid to a pH higher than 8.0 to 10 by adding carbonate salt during fermentation wherein sodium chloride is added after fermentation.

2. The method of claim 1, wherein said fermentation is acetate or citrate fermentation.

3. A modified protein containing material made by contacting said material with an organic acid fermentation liquid having a pH higher than 8.0 to 10 produced by fermentation of a carbohydrate or carbohydrates wherein a carbonate salt was added to the liquid during fermentation.

4. The modified protein-containing material of claim 3, wherein the protein-containing material is selected from the group consisting of animal meats, fishery products and beans.

5. A method for modifying a protein-containing material by contacting said material with an organic acid fermentation liquid having a pH higher than 8.0 to 10 produced by fermentation of a carbohydrate or carbohydrates wherein a carbonate salt was added to the liquid during fermentation and sodium chloride is added after fermentation.

6. A modified protein-containing material made by the process of claim 5.

7. The modified protein-containing material of claim 6, wherein the protein-containing material is selected from the group consisting of animal meats, fishery products and beans.

8. A method for modifying a protein-containing material by contacting said material with an organic acid fermentation liquid having a pH higher than 8.0 to 10 produced by fermentation of a carbohydrate or carbohydrates wherein a carbonate salt was added to the liquid during fermentation and said fermentation is acetate or citrate fermentation.

9. A modified protein-containing material made by the process of claim 8.

10. The modified protein-containing material of claim 9, wherein the protein-containing material is selected from the group consisting of animal meats, fishery products and beans.

* * * * *